(12) United States Patent
Somaia

(10) Patent No.: US 6,748,290 B2
(45) Date of Patent: Jun. 8, 2004

(54) SYSTEM AND METHOD FOR TEXTILE PRODUCTION

(75) Inventor: Hiten Anil Somaia, Kilsyth (AU)

(73) Assignee: Mahoney & Somaia Pty. Ltd., Victoria (AU)

(*) Notice: Subject to any disclaimer, the term of this patent is extended or adjusted under 35 U.S.C. 154(b) by 0 days.

(21) Appl. No.: 10/362,271
(22) PCT Filed: Sep. 11, 2001
(86) PCT No.: PCT/AU01/01137
§ 371 (c)(1), (2), (4) Date: Apr. 8, 2003
(87) PCT Pub. No.: WO02/23410
PCT Pub. Date: Mar. 21, 2002

(65) Prior Publication Data
US 2003/0187538 A1 Oct. 2, 2003

(30) Foreign Application Priority Data
Sep. 15, 2000 (AU) .............................................. PR 0192
Mar. 13, 2001 (AU) .............................................. PR 3712

(51) Int. Cl.$^7$ .......................... G06F 17/60; G06F 19/00
(52) U.S. Cl. ........................................ 700/140; 705/27
(58) Field of Search ................................ 700/140, 130, 700/131, 132, 133; 139/319; 705/27, 26

(56) References Cited

U.S. PATENT DOCUMENTS

| 5,517,404 A | 5/1996 | Biber |
| 5,818,720 A | * 10/1998 | Grigalunas .................. 700/140 |
| 6,381,510 B1 | * 4/2002 | Amidhozour et al. ........ 700/130 |
| 2001/0007995 A1 | 7/2001 | Makino |

* cited by examiner

Primary Examiner—Peter Nerbun
(74) Attorney, Agent, or Firm—Welsh & Katz, Ltd.

(57) ABSTRACT

A method of producing a textile product, including the steps of: receiving order information from a customer over a network, the order information including an image to be reproduced on the textile product; processing the order information to create an order record readable by an automated weaving machine; and causing the weaving machine to weave the textile product according to the order record so as to have a representation of the image on a face of the textile product.

32 Claims, 6 Drawing Sheets

FIGURE 4

G1 = GROUND 1 ETC
P1 = PILE 1 ETC
X = THE WARP YARN IS ABOVE THE WEFT
(BLANK) = THE WEFT YARN IS ABOVE THE WARP

FIGURE 5

G1 = GROUND 1 ETC
P1 = PILE 1 ETC
X = THE WARP YARN IS ABOVE THE WEFT
(BLANK) = THE WEFT YARN IS ABOVE THE WARP

SYSTEM AND METHOD FOR TEXTILE PRODUCTION

FIELD OF THE INVENTION

The present invention relates generally to a system and method for textile production. In particular, the invention relates to a system and method for producing a textile based on an image received from a customer.

BACKGROUND OF THE INVENTION

Mass production of textiles occurs in many manufacturing centres around the world. In most cases, the manufacturer chooses to produce, or is contracted to produce, a textile having a particular visual appearance or "design" and proceeds to manufacture large quantities of the textile having that design. For example, for a particular beach towel design, the manufacturer may produce one thousand beach towels having that design. It is generally not economically viable for the manufacturer to produce low quantities of a textile of a particular design as there are set-up costs associated with setting up the textile weaving machinery for each different design.

If a customer desires to have a particular design or image applied to a beach towel, for example, he must bear the time costs of consulting the manufacturer or manufacturer's agent in relation to that design and the costs of having the towel weaving machinery set up specifically for that towel design, with the result that that particular towel is inordinately expensive relative to most towels available on the market. Additionally, it is generally not possible to manufacture only one towel at a time and if the weaving machinery is set up to produce one particular design, there is usually a set number of towels which must be produced in weaving a design cycle by the machinery. Therefore, if the consumer only wants one towel of the particular design, the remaining towels are wasted.

SUMMARY OF THE INVENTION

The present invention provides a method of producing a textile product, including the steps of:
  receiving order information from a customer over a network, the order information including an image to be reproduced on the textile product;
  processing the order information to create an order record readable by an automated weaving machine; and
  causing the weaving machine to weave the textile product according to the order record so as to have a representation of the image on a face of the textile product.

By this method, it is possible to provide for automatic production of the textile product such that a number of customer orders may be processed and woven within a batch of textile products. Each customer can order a customized textile product but because the individual customer designs are processed within a single batch, it is not necessary for the customer to pay for the entire batch set-up cost. As the method is automatic and does not require a human operator to be involved during the set-up phase of production of the textile product, the production cost is advantageously made more economically viable. Advantageously, by processing a number of different customer orders within a single batch, the cost of each textile product is commensurately reduced and becomes affordable to the consumer.

Advantageously, the method can be used to process a number of different customer orders using a number of weaving machines.

Preferably, a plurality of automated weaving machines is provided, each being set up to provide textile products of a different binary colour selection and/or size selection whereby a plurality of batches of textile products, each batch having a particular binary color selection and size selection associated therewith, can be woven by respective weaving machines. Accordingly, a customer is able to select a particular binary color selection and/or size from the range offered by the set up of the different weaving machines. The plurality of weaving machines may be distributed among a number of different manufacturing locations, either within a single country or around the world.

To put this in to effect, preferably the order information further includes the following:
  (a) payment information to enable the customer to be charged a payment for the production of the textile or account information relating to a pre-existing account that that customer may have for the purposes of ordering the production of textiles;
  (b) information as to any text which is to be placed adjacent the image on the textile, including size, style and font of the text;
  (c) information as to which of a predetermined set of binary colors is to be used for representing the image on the textile product (eg. black/white, blue/red, green/yellow);
  (d) information as to the preferred size of the textile product, selected from a predetermined set of size options;
  (e) information as to the preferred textile material to be used for the textile product, selected from a predetermined list of materials;
  (f) address and contact information of the customer.

Preferably, the automated weaving machine includes a jacquard machine. Reference hereinafter to ajacquard weaving machine is a reference to ajacquard machine in a controlling relationship with the mechanical weaving functions of the weaving machine (also called a "loom").

Preferably, the step of receiving is performed by a web server in communication with the network Preferably, after the step of receiving, the method further includes a step of confirming the validity of the payment information and registering a charge against the customer in accordance with that payment information if it is confirmed to be valid. Preferably, the step of confirming also includes parsing the order information to check that it constitutes valid order information.

Preferably, the step of processing further includes the step of downloading the order information to a design station for conditioning the image. Preferably, the conditioning includes filtering to enhance the contrast of the colors within the image and cropping of the borders of the image.

Preferably, the conditioning includes converting the image to a 41 point grey scale. Preferably, the step of processing includes the step of creating a weave in accordance with the converted 41 point grey scale image, such that:
  weave number zero corresponds to all pile loops on the face of the textile being of the first binary colour;
  weave number 40 corresponds to all pile loops on the face of the textile being of the second binary color;
  weave number 5 (for example) corresponds to 35 of the 40 loops being of the first binary colour and 5 of the loops being of the second binary colour.

Preferably, in the example regarding weave number 5 above, the five loops of the second binary colour are evenly but irregularly distributed among a block of 40 loops. Preferably, the step of processing further includes a step of converting the 41 point grey scaled image to a file format for reading by the weaving machine. For example, a so-called "Card Image" (CI) file format may be appropriate for reading by some jacquard weaving machines.

Preferably, the method further includes the step of forwarding the order information to a production management system for tracking the production of the textile product ordered by each customer. Preferably, the web server interfaces with the production management system for reporting to the customer which stage of production the textile product is in at the time of a customer request for such a report via the web server.

Preferably, the method further includes, prior to the step of causing the weaving machine to weave, the steps of scheduling a plurality of order records for weaving by the weaving machine in one batch and scheduling a further plurality of order records for weaving by the weaving machine in a second batch of textile products. Preferably, each of the order records in a batch of textile products has the same binary color selection and size selection as the other order records in that batch.

Preferably, the jacquard weaving machine includes a computer processor and memory and is adapted to store a plurality of order records for producing a batch of textile products. Preferably, following the step of causing the weaving machine to weave, the method further includes the step of feeding the batch of textile products to an automatic cutting and sewing machine to separate each of the textile products from each other. Preferably, the method farther includes the steps of automatically inspecting, packing and labelling the textiles and shipping each textile product to the consumer by whom that product was ordered.

The present invention also provides a system for producing a textile product, including:

means for receiving order information from a customer over a network, the order information including an image to be reproduced on the textile product;

means for processing the order information to create an order record readable by an automated weaving machine; and means for causing the weaving machine to weave the textile product according to the order record so as to have a representation of the image on a face of the textile product.

Preferably, the textile product is a towel. Alternatively, the textile product is a rug or other loop pile textile. Alternatively, the textile product is a non-loop pile textile, for example such as upholstery fabric, a tea towel or a flat 'throw rug'. Preferably, the image includes one or more graphics and/or text images.

The present invention also provides a method of producing a textile product, including the steps of:

receiving order information from a customer over a network, the order information including an image to be reproduced on the textile product;

processing the order information to create an order record readable by an automated weaving system;

transmitting the order record to the weaving system to enable the weaving system to weave the textile product according to the order record so as to have a representation of the image on a face of the textile product.

Preferably, the weaving system includes a server for receiving the order record and at least one automated weaving machine responsive to the server for weaving the textile product.

The weaving system may be located locally or remotely relative to where the order information is processed. Multiple textile products of the same or a different kind can be produced by the system and method, using one or more automated weaving machines as appropriate.

Advantageously, preferred embodiments of the invention provide the following features:

1. The customer can order a single textile, or another small number such as four, according to a design chosen by that customer without incurring the inordinate expense and wastage of having the weaving machines set up especially for that particular design, thereby allowing the customer to order a personalized towel or a rug at a normal price for a towel or a rug.

2. The customer can place his or her order over the Internet by using a web based application hosted by the web server. Advantageously, the web based application allows the customer to upload the image and modify it to be of the appropriate size or scale so that he or she can see an example of how the textile product would look once it had been woven by the system.

3. The automatic processing of the order information and operation of the weaving machine allows for each batch of towels, for example, to include a number of different product designs within the same batch of towels and enables fast and efficient processing of the orders.

The invention is described in greater detail hereinafter, by way of example only, with reference to embodiments thereof illustrated in the accompanying drawings which are briefly described below.

BRIEF DESCRIPTION OF THE DRAWINGS

FIGS. 1a to 1e show alternative image layouts on a textile;

FIG. 4 is a diagram illustrating the relationship of the weft picks and warp ends for weave number 0;

FIG. 5 is a diagram illustrating the relationship of the weft picks and warp ends for weave number 5;

DETAILED DESCRIPTION OF THE PREFERRED EMBODIMENTS

Figure 1D:
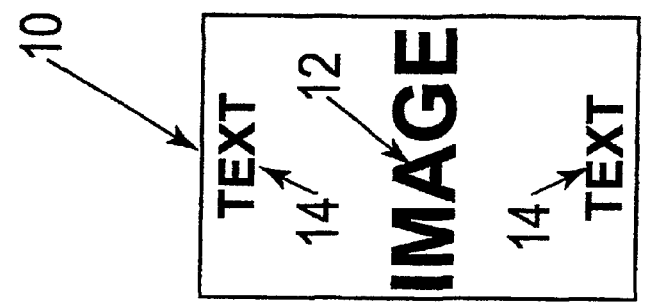
Figure 1D:
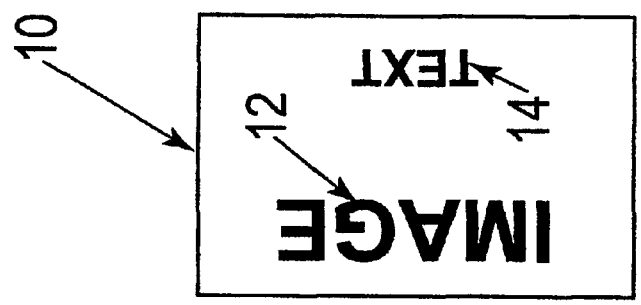
Figure 1C:
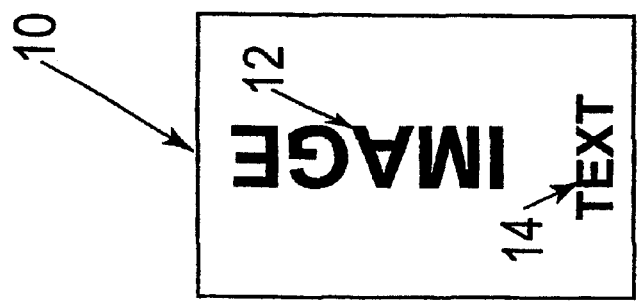
Figure 1B:
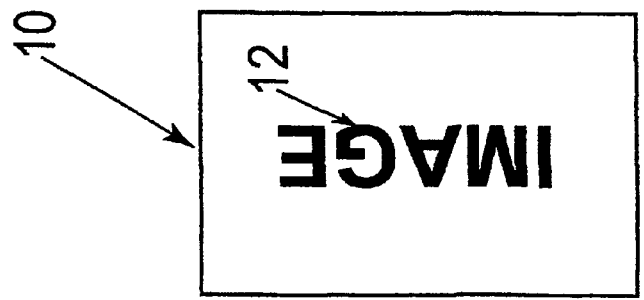
Figure 1A:
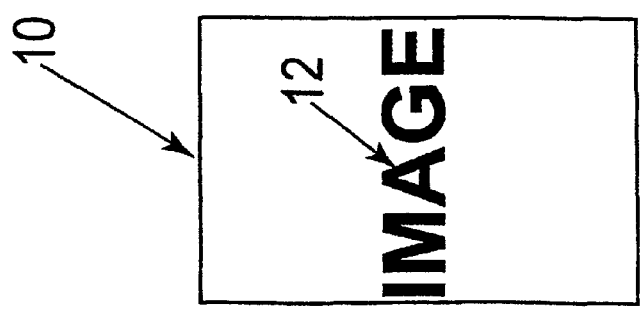

FIGS. 1a to 1e show examples of how an image 12 may be positioned or oriented on a textile 10. For the purposes of illustration, it is assumed that the textile 10 is a rectangular textile product, in the form of either a towel or a rug. However, it is possible that the system and method described below with reference to the preferred embodiments may be adapted to produce other kinds of textile products, for example a looped or non-looped upholstery material, other non-looped textiles and products of differing shapes. In FIG. 1a, the image 12 is displayed in a horizontal orientation across the face of the textile 10. In FIG. 1b, the image 12 is displayed in a vertical or longitudinal orientation along the lengthwise dimension of the textile 10. In FIG. 1c text 14 is added to the textile 10 horizontally underneath the vertically oriented image 12. In FIG. 1d, the text 14 is displayed in a vertical orientation alongside the image 12. In FIG. 1e, the text 14 is displayed both above and below the image 12 in a horizontal orientation on the textile 10. Alternative configurations of text 14 and image 12 may be provided for selection by a prospective customer.

The text 14 is limited to a predetermined number of characters, fonts and sizes. The text is not limited by alphabet, however, and may include non-roman alphabets, for example Cyrillic, Chinese, Japanese and Hebrew.

Figure 2:
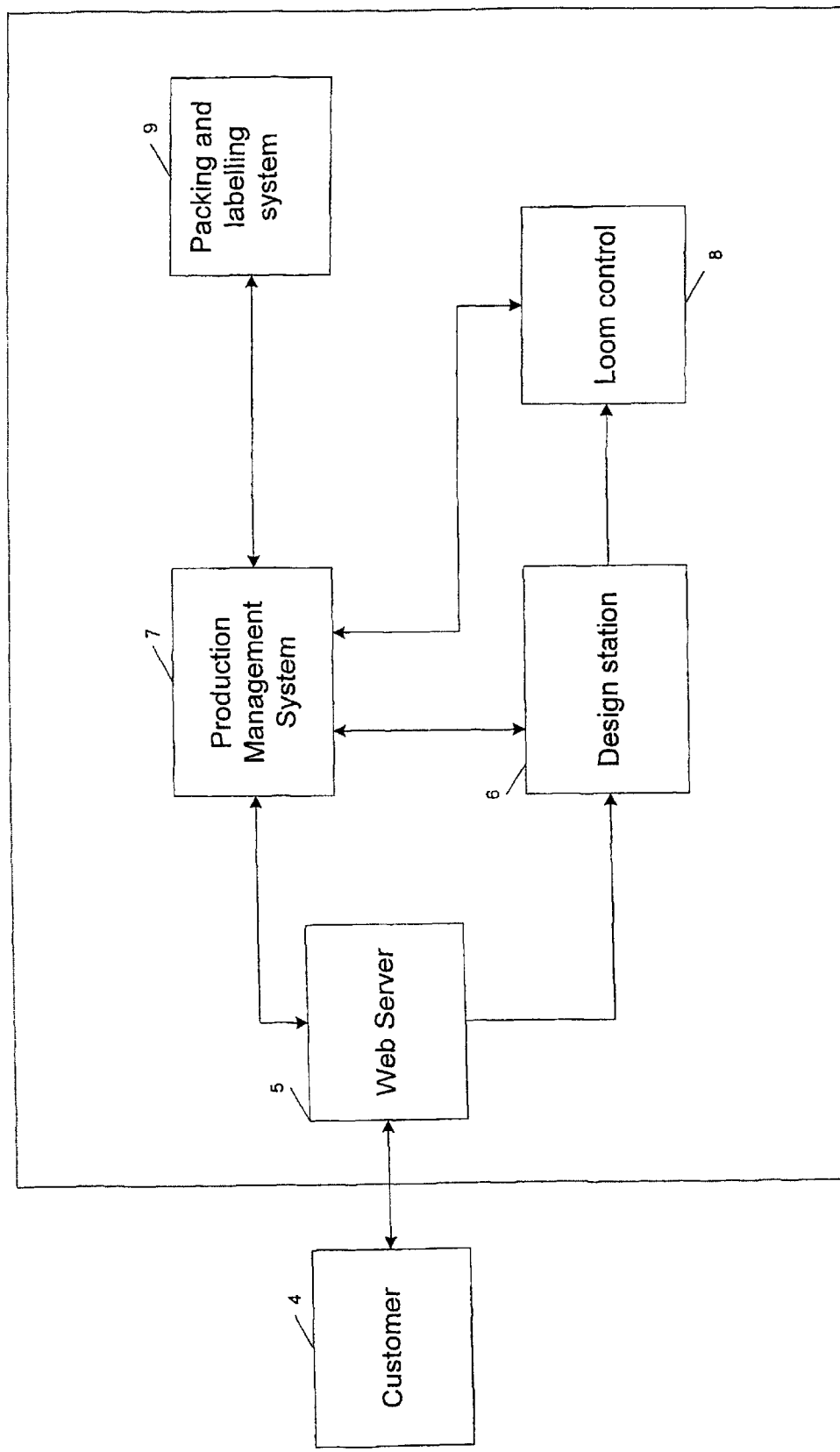
FIG. 2 is a block diagram of a system for producing a textile product in accordance with an embodiment of the invention.

FIG. 2 shows a system 2 for textile production, adapted to communicate with a customer 4 via a web server 5. The system 2 includes the web server 5, a production management system 7, a design station 6, a scheduling and loom control system 8 and a packaging and labelling system 9.

The system 2 is configured so as to enable the customer 4 to visit a web site hosted by the web server 5 for ordering a textile 10. The web site includes a tailored web-based application whereby the customer can upload an image, together with text, and view a sample textile manufactured in accordance with the selected size, color selection, textile material (if such an option is provided) and selected text 14. The customer uploads the image 12 to the web server 5 using commonly available uploading algorithms for file uploads such as those available on recent versions of Internet Explorer or Netscape Navigator. The web server 5 also provides a secure order form for capturing customer credit card information or other account payment information. Instead of uploading the image 12, the customer can select an image 12 from an online library. When ordering the textile product, the customer has the option to fit the selected image to the entire product or to locate the image within the product at a particular location, for example in the centre or in the top right-hand corner.

In one embodiment, the web server 5 also allows a customer 4 to check at what stage of production their product order stands, for example whether it is presently queued for weaving on the looms, is at the packaging and labelling stage or has already been sent to the customer. This feature is facilitated by the production management system 7 which is configured to interrogate the scheduling and loom control system 8 and the packaging and labelling system 9 as to the status of each order and to report this status to the web server 5 at regular intervals or upon receiving a status request therefrom.

Once a customer 4 has uploaded an image 12 and provided appropriate payment information, the web server 5 communicates with a relevant credit authority to verify the payment information or, if the customer has an existing account, verifying that that account is in good order. Once the payment information is suitably verified by the web server 5, the customer order is accepted and the web server 5 provides order confirmation information to the customer 4 which includes an order number. The order number may be used by the customer 4 when interrogating the web server 5 as to the status of the order.

In communication with the web server 5 is a database (not shown) for storing data records corresponding to each customer order. Each data record includes all of the order information received from the customer and further includes a time stamp of when the order information was received, the credit authority confirmation receipt, the order number allocated to that order (which is the key field for tracking the customer's order through the system 2) and any other pertinent information for tracking, record keeping or marketing purposes which may be ascertained from or attached to the order information provided from the customer 4. If there is more than one textile manufacturing facility adapted to receive orders from the web server 5, which arrangement is described later in this description, the data record for each customer will also include an indication as to which manufacturing facility is processing that customer order. If the order relates to more than one product, each product is allocated a unique identifier (which may incorporate the order number) and all such products are linked to the same order number. If different products in the same order are produced by different weaving machines within the same manufacturing facility, the system tracks the production of each textile and may delay delivery of the first-produced textile if necessary so that all textile products within the same order can be shipped to the customer at the same time. If the products in the same order are produced at different manufacturing facilities, they are shipped to the customer separately.

The web server 5, in combination with the data base, is adapted to receive most common forms of image file. Once the image file is received, together with the other order information, the web server creates an image packet which includes the image file received, customer-selected options such as binary color combination and the order number corresponding to the customer order with which that image was received. The image packet is processed so as to convert the image into a TEF format for reading by the design station 6.

The web server 5 also creates an order packet once the customer data record is established in the database. The order packet again includes the order number as the key identifier and includes the number of products and product type, unique product identifier, time stamp information, customer address details, etc. and is forwarded to the production management system 7 for tracking of the customer order.

The production management system 7 is a normal production management system suitable for tracking orders and inventory and may be a suitable commercially available system such as Datatex. The primary functions of the production management system 7 are to monitor the status of the customer orders and to monitor the machinery and production operations, including automatically generating orders for further materials when those materials get low in stock level. Another primary function of the production management system 7 is to plan the allocations of the orders to the different looms. For example, if four rolls of towels are to be woven simultaneously and each roll is to have 50 towels, the task of mapping the customer orders to the grid of 200 towel positions in that production batch is done by the production management system 7. The production management system 7 also assigns a roll number to each roll, which is woven at the start and end of each roll to assist product tracking. The production management system 7 is also responsible for instructing the packaging and labelling system 9 to print labels for attachment to the packaged products prior to sending. The production management system 7 holds information concerning customer orders including address and billing information, this customer information being received from the web server 5 in an order packet when the customer order is accepted.

The design station 6 receives order information in the form of an image packet from the web server 5 including the image 12, text 14 (if applicable), binary (or other) color scheme to be used and other selected features to be applied to the textile 10. The design station 6 is configured to automatically filter the image 12 so as to enhance the contrast therein by applying known computerised enhancement techniques (available in most commercial design packages) and will crop the image to fit the appropriate dimensions if required. The design station 6 then automatically converts the image 12 into a 41 point grey scale image using known color conversion algorithms and automatically scales the image 12 so that it is reproduced correctly on the textile 10 for the given weave program. This can be performed irrespective of whether the image is originally full color, black and white or any other color scheme. Once the image 12 is converted to the 41 point grey scale, the design station 6 processes the grey scaled image to create a weave file, usually in the format of a card image (CI) file, for weaving the textile. The CI file is readable by commercially available textile jacquard machine platforms such as Grosse and is made up of a number of weave instructions such that all of the weave instructions, when executed by the weaving machine, will result in a textile having the appropriate image 12 and text 14 (if applicable), or at least an accurate representation thereof.

The weaving instructions are determined using the 41 point grey scale as follows, using the example where the textile is a towel. A towel is constructed from three yarns woven together; a pile "warp" yarn, a ground warp yarn and a "weft" yarn; the weft yarn usually runs in the widthwise direction of the towel and the warp yarn usually runs in the lengthwise direction. The pile warp yarn is what forms the apparent loops on a towel surface.

In a traditional towel weave with no design element, pile warp yarns 1, 3, 5, 7, etc weave on the face of the towel and pile warp yarns 2, 4, 6, etc weave on the back of the towel. If the odd pile warp yarns and the even pile warp yarns are of a different color, then it is possible to weave a design into the towel by creating a contrast among the odd and even pile warp yarns. For example, if the odd yarns were black and even yarns white, a traditional weave would give a black faced, white backed towel. However, if towel yarns, 1, 2, 5, 6, 9, 10, etc were woven on the face of the towel and pile warp yarns 3, 4, 7, 8, 11, 12, etc were woven on the back of the towel, the result would be a "grey" looking towel on the face and on the back.

Weaving involves a process of interlacing two perpendicularly oriented sets of yarn, namely the "warp ends" and the "weft ends". The warp ends are the yarns which run parallel to the selvedge (the edge of the woven fabric), which is generally lengthwise or longitudinally along the fabric. The weft ends are the yarns which run laterally across the textile, perpendicular to the warp ends.

A towel is made from three sets of yarn, two sets of which are warp ends and the other set of which are the weft ends. One set of warp ends forms the base structure of the textile and is called the ground warp. The individual threads of the ground warp are called ground ends. The other set of warp ends forms the loops on the surface of the towel and is known as the pile warp. The individual threads of the pile warp are called pile ends. A weft thread inserted through the warp thread during weaving is known as a pick.

To weave 40 loops in a weave block on the towel on the top and 40 loops on the bottom, the weaves can consist of:

a) 80 pile ends, 80 ground ends and 3 weft picks;
b) 40 pile ends, 40 ground ends and 6 weft picks;
c) 20 pile ends, 20 ground ends and 12 weft picks;
d) 16 pile ends, 16 ground ends and 15 weft picks;
e) 10 pile ends, 10 ground ends and 24 weft picks;
f) 8 pile ends, 8 ground ends and 30 weft picks;
g) 4 pile ends, 4 ground ends and 60 weft picks; or
h) 2 pile ends, 2 ground ends and 120 weft picks.

Figure 4:
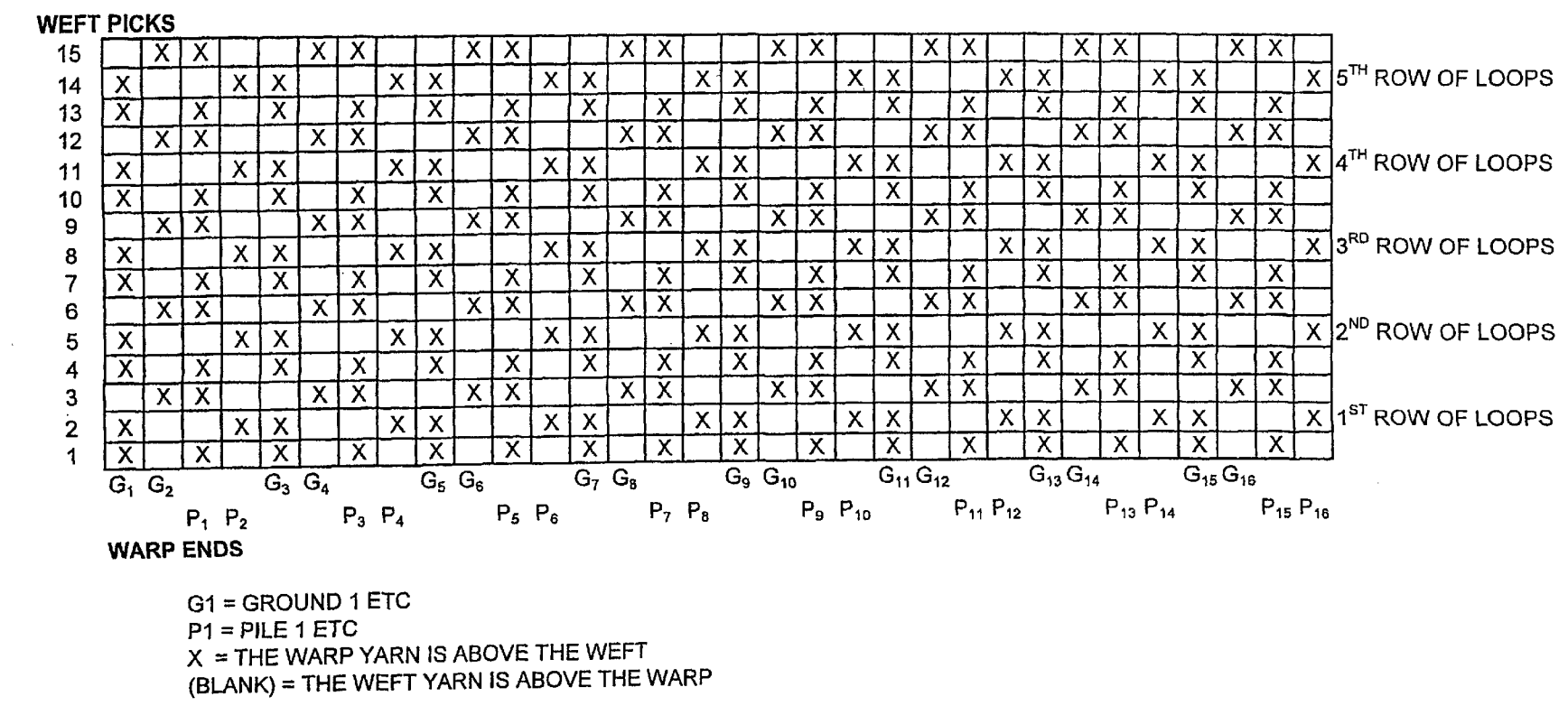
Figure 5:
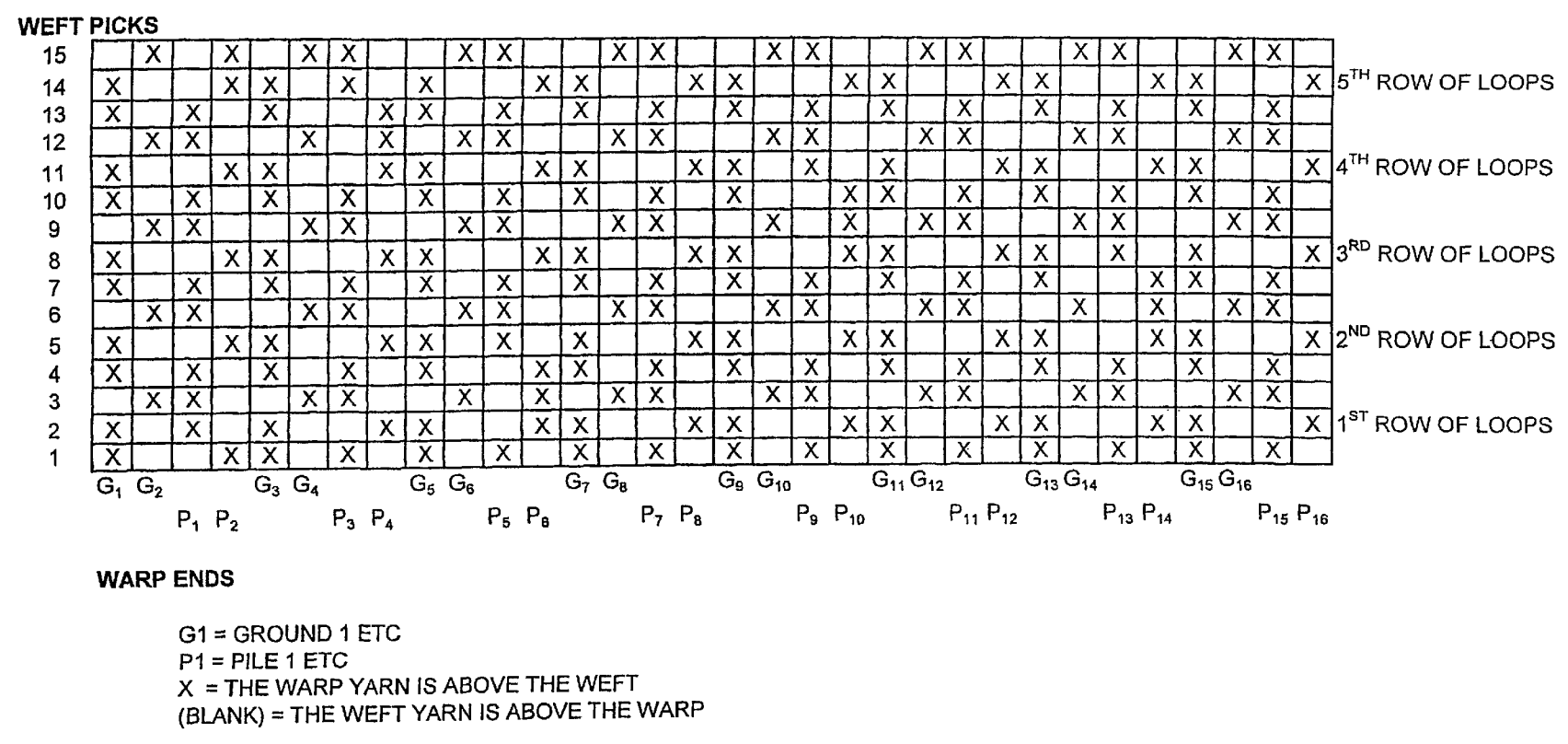

The presently described embodiment of the invention uses option d) to control the 40 loops in each block of the towel. Shown in FIGS. 4 and 5 are the weave representations for weave numbers 0 and 5, respectively.

Weave number 0 is a block in which all 40 loops on the nominal face of the towel in the relevant 8 by 5 block will be white and all 40 loops on the nominal back of the towel are black (if using a black/white binary color combination, for example). In processing the image 12 to create the weave file, the areas of the image that are the lightest are determined to correspond to grey scale zero and are assigned to weave number zero. Weave number 40 is a block in which all 40 pile ends on the face of the towel are black. Weave number 40 is used for the areas of the image that are the darkest and which correspond to grey scale 40. Weave numbers 1 to 39 are determined in such a way that there is an increase in the number of black loops on the face of the towel in equal gradation moving from grey scale 1 to 39. This effectively means that, within the 40 loops in the 8 by 5 block on the surface, for weave number 2, 2 out of every 40 loops will be black, with the location of those black loops being determined according to the pre-defined weaves so as to appear from a distance to be a shade of grey. Similarly, for weave number 10, $^{10}/_{40}$ths of the 40 loops will be black on the face of the towel and white on the back of the towel, with the black loops being evenly but irregularly distributed among the white loops in the 8 by 5 block to which weave number 10 is allocated.

The 41 point grey scale is chosen so as to speed up the conversion of the image file into the weave file. Between the 41 and 64 point grey scales, for example, there is little noticeable difference in the definition of the image. The system 2 is, however, effective with any number of grey scale chosen, even down to a grey scale of 2, but the weave design may need to be changed accordingly.

Once the weave file is created, this is passed to the production management system 7. Each weave file corresponds to a towel and is queued by the production management system 7 so as to concatenate the weave files into a batch for consecutive weaving by one of a number of weaving machines (not shown). As each weaving machine is not set up to be able to weave different binary color combinations within the same batch, each batch must have towels of the same binary color combination. Also, each towel within each batch should be of the same size. Generally, there will be a number of weaving machines, each set up to weave a particular binary color combination and towel size. However, the system can work with just one weaving machine. Therefore, the production management system 7 will schedule a batch of towels to be woven once the number of towels having the same binary color combination and size reaches a predetermined level, for example 40. Alternatively, if it appears that there may be an undue delay to the customer order being processed, the production management system 7 may instruct the weaving machine to weave a batch of towels containing less than the predetermined number of customer orders. For example, if the predetermined number is 40 but the number of customer orders for towels of a particular color combination is presently 26 and at least one of those customer orders has been waiting for a period which is considered to fall marginally short of an unacceptable delay, that batch of customer orders will be woven by the weaving reachine so as to satisfy the 26 customer orders. An unacceptable delay may be considered to be five days, for example, in which case the batch will be woven if an order in the batch is between four and five days old. Due to the system's capacity to process orders originating internationally and automatically at any time of day, the maximum acceptable delay may be set at a certain number of hours, for example 100 hours.

In one embodiment, the system 2 is set up such that the web server 5 interfaces with manufacturing facilities located in various countries around the world so that orders originating from that country may be processed and sent locally, or at least processed by a manufacturing facility located more proximately to the destination address of the ordered textile product. In this case, the web server 5 forms a central hub from which orders are processed and forwarded on to the various manufacturing facilities, each of which has a local production management system 7, design station 6, loom control system 8, one or more weaving machines and a packaging and labelling system 9.

The scheduling and loom control system 8 communicates with the production management system 7 once each weaving machine has woven a batch and upon a request therefrom for the purpose of updating the status of each customer order.

The packaging and labelling system 9 receives the woven textiles 10 from each sewing machine, whereupon automatic inspection, packaging and labelling machines process the customer orders. Such machines are commercially available. The production management system 7 provides information as to which textile corresponds with which customer order and provides information as to the customer name and postal address corresponding to each order and this information is used accordingly by the packaging and labelling system 9 to process the textiles 10. For example, the production management system 7 may send a data table to the packaging and labelling system 9 indicating that the textile for customer order number 98770 is located in batch position 1 of 40 and therefore the textile cut from batch position 1 will be processed accordingly. Optionally, the packaging and labelling system 9 may include visual inspection apparatus such as is commercially available, adapted to capture an image of the woven textile, for comparison with the original image 12 forwarded from the design station 6 to the scheduling and loom control system 8 for the purpose of quality control. If the correlation between the image captured by the packaging and labelling system 9 with the image 12 as processed by the design station 6 is below a correlation threshold as determined by the perceived quality requirements, the particular textile under inspection may be withdrawn from the automated packaging and labelling procedure and subjected to human visual inspection. For this purpose, the packaging and labelling system 9 sends the captured image of the finished textile to the design station 6, where the correlation is calculated. Known image correlation methods may be used for this purpose.

Tracking of the textile products may be facilitated by an electronically encoded chip or metallic thread which is adapted to respond to a radio frequency (RF) probing signal for scanning the order numbers of the textile products during different production stages. The results of the scans are relayed to the production management system 7. The pre-encoded metallic thread may be woven into the textile during the weaving step. Alternatively, if an encoded chip is to be used, this is attached to the woven textile product during the weaving process. If the chip has not already been encoded when attached, it is then encoded (automatically or by a human operator) with the order number. Alternatively, tracking may be achieved by weaving a particular pattern of symbols, human recognizable or otherwise, into an edge or hem of the textile and which is recognizable by a form of optical character recognition. The pattern corresponds to the unique product identifier or the order number and can be woven with coloured thread or thread which is only visible under fluorescent/ultra-violet light.

Alternatively, or in addition, the textiles may have a barcode label affixed to the hem during the sewing stage. The barcode labels are printed by a barcode printer (not shown) in communication with the production management system 7.

Figure 3:
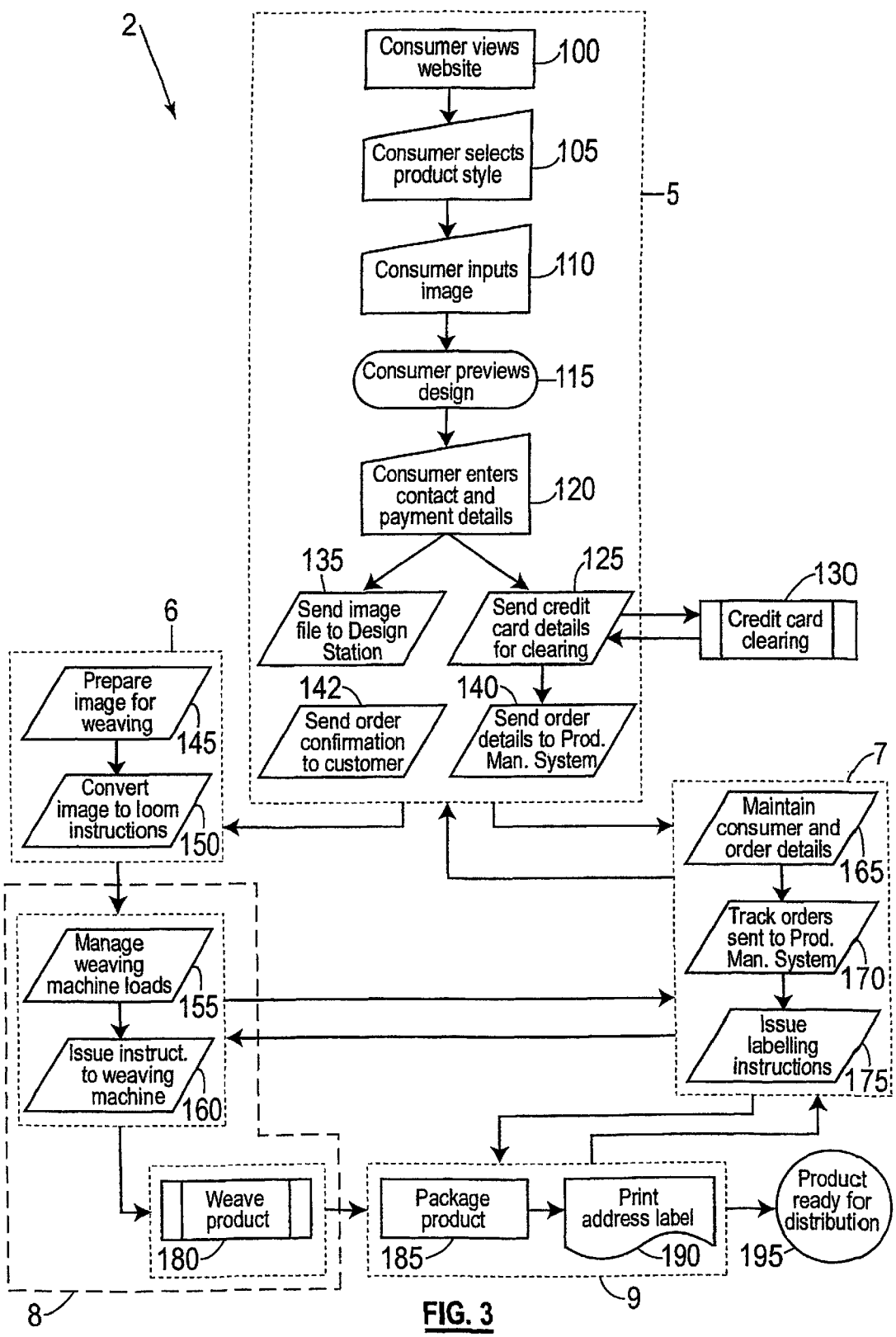
FIG. 3 is a process flow diagram of a method for producing a textile product in accordance with an embodiment of the invention.

FIG. 3 shows a method of a preferred embodiment of the invention for producing textile products. Initially, at step 100, the customer visits the web site hosted by the web server 5. Once the customer 4 selects a product style at step 105 and uploads the image to the web server 5 at step 110 the customer 4 is provided with a preview of the image as applied to his or her desired textile product at step 115. If the customer 4 is satisfied with the preview and elects to proceed with the order, the customer 4 then enters the appropriate contact and payment details at step 120. At step 125, the web server 5 sends a credit card verification request to an appropriate outside authority. Once that credit card verification is received in the affirmative from the outside authority at step 130, the system 2 proceeds to send the image file to the design station 6 at step 135 and the customer contact and order details to the production management system 7 at step 140. The customer 4 also receives confirmation that the order is being processed and is given the order number (allocated by the web server) to that order for the customer's reference at step 142.

Once the order information is received by the design station 6 from the web server 5, the image is prepared for weaving at step 145 by applying filters or other cropping, scaling or contrast enhancement steps. Step 145 also includes converting the image to the 41 point grey scale. At step 150, the 41 point grey scaled image is processed to create the CI file (according to the conversion method described above). The design station 6 then forwards the CI file to the production management system 7 where, at step 155, the customer order is queued for production in the appropriate batch of textiles for the customer-specified binary color combination. Once a batch is determined by the production management system 7 to be ready for production, the order sequence is passed to the loom control system 8 which issues the appropriate instructions at step 160 to the loom (or "weaving machine") that is set up to weave the appropriate color combination and the batch of textiles is woven at step 180.

After each batch of textiles 10 is woven by a weaving machine, the batch is forwarded to the packaging and labelling system 9, where each of the products is cut from the batch, sewn, inspected and packaged at step 185. The packaging and labelling system 9 then prints the address label and applies that label to the packaged product at step 190, after which the product is ready for distribution to the customer 4 at step 195.

Following step 140, the customer order details are forwarded to the production management system 7 whereupon an order record is created and maintained for that order at step 165. The production management system 7 then tracks the production of the textile 10 by querying the design station 6, loom control system 8 and packaging and labelling systems 9. If a particular customer order has waited a certain period of time to be processed, the production management system 7 may release an incomplete batch to the loom control system 8 to proceed to weave the batch without having received the predetermined number of orders for that batch at step 170. This tracking step 170 also includes receiving an order update from the loom control system 8 once an order has been woven. The production management system 7 then tracks that order through the packaging and labelling system 9, whereupon labelling instructions are issued at step 175 to the packaging and labelling system 9.

Examples of commercially available systems which can be used for the production management system 7, design station 6, scheduling and loom control system 8 and packaging and labelling system 9 are the proprietary "Datatex", "Sophis", "Grosse" and "Siscodata" systems, respectively. These systems must be programmed to communicate with each accordingly to achieve the functionality required by the preferred embodiments of the invention.

Figure 6:
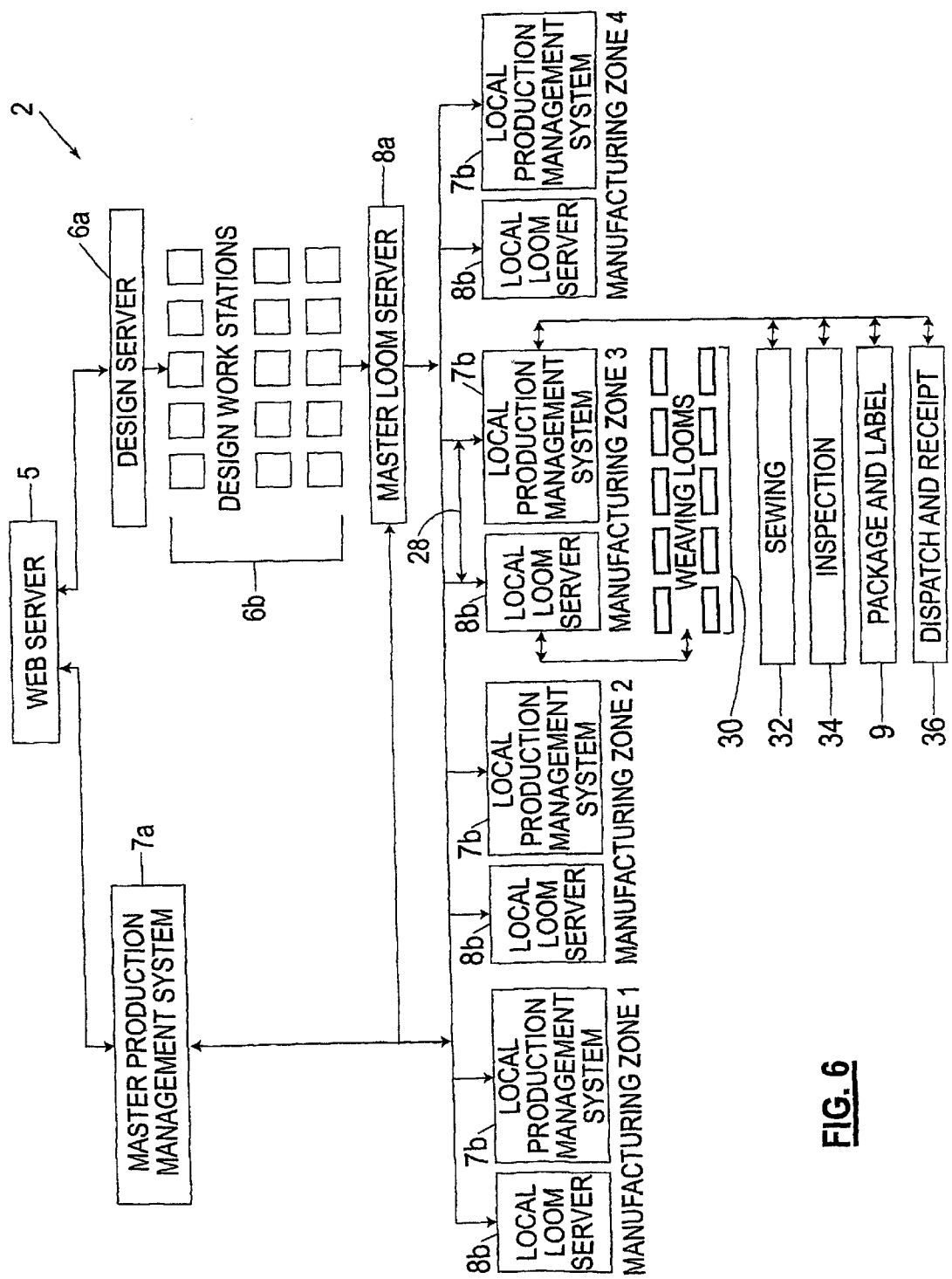
FIG. 6 is a block diagram of a system for textile production where the manufacture of the textiles is distributed over a plurality of manufacturing facilities according to an embodiment of the invention.

FIG. 6 shows a further embodiment of the system 2, where the manufacturing of the textile product is distributed over a number of separate manufacturing zones. The manufacturing zones may be located within the same facility but within a distinct zone, for example for handling separate kinds of textiles, or may be located in different parts of the country or different countries around the world. Four manufacturing zones are depicted in FIG. 6 as an example, although the system may accommodate any number of different manufacturing zones. Each manufacturing zone has a dedicated loom server 8b for interfacing with and controlling one or more weaving looms 30. The loom server 8b communicates with a production management system PMS) 7b specific to that manufacturing zone by interface 28. The textile products, once woven by the looms 30, are filter processed through manufacturing modules such as sewing 32, inspection 34, packaging and labelling 9 and finally dispatch and receipt 36. The embodiment of system 2 shown in FIG. 6 generally parallels that shown in FIG. 2 except that some modules shown in FIG. 2 are shown in two parts in FIG. 6. For example, the loom control system 8 is represented by master loom server 8a in combination with individual loop servers 8b, the functionality of design station 6 is provided by design server 6a and design work stations 6b, and the production management system 7 is effected with master production management system 7a in combination with the local production management systems 7b.

The relationships and communication lines between the various modules shown in FIG. 6 are represented in further detail in Appendix 1 of the specification.

Further in relation to the weaving looms 30, some textiles such as towels are woven on a number of distinct rolls on the same loom. For example, a loom for weaving towels may have four separate rolls where each roll is woven as a series of towels connected end to end (these are cut into separate towels in the sewing module 32). Therefore, each batch of towels produces four rolls of the same length, and including the same number of towels. For ease of processing, if a customer orders three towels, each of those towels should be woven on the same roll so that the separate towels do not have to be retrieved from different rolls. This then requires that the other rolls should be balanced, so as to weave towels for other customer orders in the corresponding roll positions at the same time. Continuing this example, if one customer order relates to three-towels, these three towels are woven in sequence on roll 1, leaving 9 other towel places which must be filled by other customer orders on rolls 2, 3 and 4.

In inspection module 34, the woven products are inspected, either automatically or by human visual inspection, for defects, arising for example from a manufacturing error or an inadvertent mark on the cloth. If the inspection reveals that a textile product is not of an appropriate quality for delivery to the customer, it is labelled as a "second" quality product and the order number of that product is entered into the system as such. All second quality products must be rewoven by the system. The production management system 7b tracks the reweaving of the second to ensure that a "first" quality garment is produced in place of the second.

The foregoing detailed description has been presented by way of example only, and is not intended to be considered limiting to the present invention. Those skilled in the art will recognise that many variations and/or modifications are possible to the described constructions without departing from the spirit and scope of the invention.

APPENDIX 1

MODULE : WEB SERVER

| INPUTS | FROM |
|---|---|
| 1. Picture file - uploaded by customer or chosen from web database | Customer |
| 2. Text or image for borders - Font style chosen from web database | Customer |
| 3. Customer name & address (billing, delivery and e-mail) | Customer |
| 4. Country of order origin and country of order delivery | Customer |
| 5. Towel or other textile sizes available at manufacturing zones | Manufacturing Zones |
| 6. Colour combinations available at manufacturing zones | Manufacturing Zones |
| 7. Credit card details | Customer |
| 8. Size of textile chosen | Customer |
| 9. Colour Combination chosen | Customer |
| 10. Quantity chosen | Customer |
| 11. Order woven - status | Master PMS |
| 12. Order sewn - status | Master PMS |
| 13. Order dispatched - status | Master PMS |
| 14. Order delivered - status | Master PMS |

TASKS

1. From delivery address and order type, choose most appropriate Manufacturing Zone
2. Display size and colour choices available
3. Accept upload of image
4. Allow user to crop image to suit chosen towel size, accounting for aspect ratio
5. Offer preview of order
6. Check credit card details and accept payment
7. Convert picture file to TIFF format

APPENDIX 1-continued

8. Assign an order number
9. Query master production management system as to order status when prompted by user enquiry

| OUTPUTS | TO |
|---|---|
| 1. Order number, name and delivery address details, country of order origin, quantity ordered, textile type, colour chosen and image file | Master PMS |
| 2. TIFF file with Order number as name of file, size (may be incorporated in order number) | Design Server |
| 3. Order Status | Customer |

MODULE : MASTER PRODUCTION MANAGEMENT SYSTEM

| INPUTS | FROM |
|---|---|
| 1. Order number, name and address details, country of order origin, quantity ordered, color chosen | Web Server |
| 2. Order progression updates | Local PMS |

TASKS

1. Deliver order details to appropriate Manufacturing Zone database
2. Send e-mail to customer once order has been dispatched
3. Storage of a complete data record for each order

| OUTPUTS | TO |
|---|---|
| 1. Order Updates | Web Server |
| 2. Order number, name and address details, quantity ordered, colour chosen, size chosen | Local PMS |
| 3. Order Number, quantity ordered, color chosen | Master Loom Server |

MODULE : DESIGN SERVER

| INPUTS | FROM |
|---|---|
| 1. TIFF file with order number | Web Server |

TASKS

1. Assign to an appropriate design work station queue (based on the product and harness (size of the textile) set up to be handled by each design work station)
2. Manage Design Workstation queues

| OUTPUTS | TO |
|---|---|
| 1. TIFF file with order number | Design Work Stations |

MODULE : DESIGN WORK STATIONS

| INPUTS | FROM |
|---|---|
| 1. TIFF File with order number | Design Server |

TASKS

1. Pull TIFF file from appropriate queue
2. Enhance contrast through filtering
3. Crop if necessary
4. Apply weaves

| OUTPUTS | TO |
|---|---|
| 1. CI file with Order number as name of file | Master Loom Server |

MODULE : MASTER LOOM SERVER

| INPUTS | FROM |
|---|---|
| 1. CI file and order number | Design Work Stations |
| 2. Manufacturing Zone | Master PMS |

TASKS

1. Distribute CI files to the loom server in the appropriate zone

| OUTPUTS | TO |
|---|---|
| 1. CI file | Loom Server |
| 2. Time when roll was downloaded for weaving | Local PMS |

MODULE : LOOM SERVER

| INPUTS | FROM |
|---|---|
| 1. CI file and order number | Master Loom Server |
| 2. Quantity ordered | Local PMS |
| 3. Colour and size ordered | Local PMS |
| 4. Order number and quantity of seconds to be rewoven | Local PMS |

APPENDIX 1-continued

| | |
|---|---|
| 5. Roll number and CI files weaving sequence in that roll | Local PMS |

TASKS

1. Add in harness instructions to CI file from size chosen
2. Set up weaving of CI files to include the roll number before and after the weaving of the "batch".
3. Insert into the CI file the weaving of the order number into the hem of the product

| OUTPUTS | TO |
|---|---|
| 1. CI files in batch queue | Weaving Looms |
| 2. TIme when downloaded for weaving | Local PMS |

MODULE : LOCAL PRODUCTION MANAGEMENT SYSTEM

| INPUTS | FROM |
|---|---|
| 1. Order number, name and address details, quantity ordered, colour chosen, size chosen and image file | Master PMS |
| 2. Time when downloaded for weaving | Loom Server |
| 3. Roll Numbers cut up | Sewing |
| 4. Order Number and quantity of seconds to be remanufactured | Inspection |
| 5. Orders packed and dispatched | Package and Label |
| 6. Orders received by customers | Dispatch and Receipt |

TASKS

1. Monitor progress of order manufacture and delivery
2. Reset for weaving the quantities of seconds
3. Set up the production "batch" for each weaving loom, taking into account the capabilities of each loom and the contents of each order
4. Assign a roll number to each roll within the production "batch"

| OUTPUTS | TO |
|---|---|
| 1. Order number, weaving sequence and roll number per weaving loom | Loom Server |
| 2. Image File (if optical recognition system is used) | Inspection |
| 3. Delivery Address | Package and Label |
| 4. Progressive updates on order manufacturing process | Master PMS |

MODULE : WEAVING MACHINES

| INPUTS | FROM |
|---|---|
| 1. CI files in batch queue | Loom Server |

TASKS

1. Retrieve batch queue CI files in sequential order
2. Weave order
3. Add RF chip or other means for enabling automatic identification of order number if required

| OUTPUTS | TO |
|---|---|
| 1. Towel rolls with roll numbers woven at the start and finish | Sewing |

MODULE : SEWING

| INPUTS | FROM |
|---|---|
| 1. Textile rolls | Weaving |

TASKS

1. Cut textiles from rolls and sew cross hems
2. Insert barcode label containing order number into hem of textile if required

| OUTPUTS | TO |
|---|---|
| 1. Individual textiles | Inspection |
| 2. Roll numbers cut up | Local PMS |

MODULE : INSPECTION

| INPUTS | FROM |
|---|---|
| 1. Textiles | Sewing |
| 2. Image file of order (if using optical recognition system) | Local PMS |

TASKS

1. Separate firsts from seconds
2. Program seconds for reweaving

| OUTPUTS | TO |
|---|---|
| 1. First quality textiles | Package and Label |
| 2. Order number and quantity of seconds | Local PMS |

APPENDIX 1-continued

MODULE : PACKAGE AND LABEL

| INPUTS | FROM |
|---|---|
| 1. First quality textiles | Inspection |
| 2. Name & Address & Quantity Details | Local PMS |

TASKS

1. Recognize (eg. through RF or OCR system) the order number
2. Collate all textiles belonging to the one order number
3. Wrap and package textiles and put on the address label

| OUTPUTS | TO |
|---|---|
| 1. Fully packaged and labelled textiles | Dispatch and Receipt |
| 2. Packed order numbers | Local PMS |

MODULE : DISPATCH AND RECEIPT

| INPUTS | FROM |
|---|---|
| 1. Fully packaged and labelled textiles | Package and Label |

TASKS

1. Deliver textiles to customer
2. Track order till received by customer

| OUTPUTS | TO |
|---|---|
| 1. Consignment note number per order | Local PMS |
| 2. Proof of delivery for each order | Local PMS |

What is claimed is:

1. A method of producing a textile product, including the steps of:
   receiving order information from a customer over a network, the order information including an image to be reproduced on the textile product;
   processing the order information to create an order record readable by an automated weaving machine; and
   causing the weaving machine to weave the textile product according to the order record so as to have a representation of the image on a face of the textile product.

2. The method of claim 1, wherein the step of receiving is performed by a web server in communication with the network.

3. The method of claim 1, wherein after the step of receiving, the method further includes the steps of:
   confirming the validity of the payment information; and
   registering a charge against the customer in accordance with that payment information if it is confirmed to be valid.

4. The method of claim 3, wherein the step of confirming also includes parsing the order information to check that it constitutes valid order information.

5. The method of claim 1, wherein the step of processing further includes the steps of transmitting the order information to a design station and causing the design station to condition the image.

6. The method of claim 5, wherein conditioning the image includes filtering to enhance a contrast of colors within the image and cropping borders of the image.

7. The method of claim 5, wherein conditioning the image includes converting the image to an x-point grey scale image, where x is an integer greater than 1.

8. The method of claim 7, wherein the textile product is a loop-pile textile and the step of processing includes the step of creating a weave file for weaving the x-point grey scale image, such that:
   weave number zero corresponds to all pile loops on the face of the textile product being of a first binary color of the x-point grey scale;
   weave number x−1 corresponds to all pile loops on the face of the textile being of a second binary color of the x-point grey scale; and
   weave number y corresponds to x−1−y of the x−1 pile loops being of the first binary color and y of the loops being of the second binary color, for 0<y<x−1.

9. The method of claim 8, wherein in weave number y, they pile loops of the second binary color are evenly but irregularly distributed among a block of x−1 pile loops.

10. The method of claim 8, wherein said order record includes said weave file.

11. The method of claim 1, wherein the method further includes the step of forwarding the order information to a production management system for tracking the production of the textile product.

12. The method of claim 11, wherein a web server is in communication with the production management system and is adapted to report which of a plurality of production stages of production the textile product is in to the customer in response to a customer request via the web server.

13. The method of claim 1, wherein the method further includes, prior to the step of causing the weaving machine to weave, the steps of scheduling a plurality of order records for weaving by the weaving machine in one batch of textile products and scheduling a further plurality of order records for weaving by the weaving machine in a second batch of textile products.

14. The method of claim 13, wherein each of the order records in each batch of textile products has a same binary color selection and size selection as other order records in that batch.

15. The method of claim 1, wherein the step of causing the weaving machine to weave is performed for a plurality of order records, thereby producing a plurality of textile products together in a batch, the method further including the step of feeding the batch of textile products to an automatic cutting machine to separate each of the textile products from each other.

16. The method of claim 15, wherein the method further includes the steps of automatically inspecting, packing and labelling the textiles and shipping each separated textile product to respective customers.

17. A process for producing a plurality of textile products, wherein the method of claim 1 is executed using a plurality of automated weaving machines, each being arranged to weave textile products of a different binary color selection and/or size selection, whereby a plurality of batches of textile products can be woven by respective weaving machines, each batch having a particular binary color selection and size selection associated therewith.

18. The process of claim 17, wherein the binary color selection and/or size selection is included in the order information, said selection being made by the customer from a predetermined set of binary color and size options.

19. The process of claim 17, wherein the plurality of automated weaving machines are located in a plurality of manufacturing locations.

20. A system for producing a textile product, including:
   means for receiving order information from a customer over a network, the order information including an image to be reproduced on the textile product;
   means for processing the order information to create an order record readable by an automated weaving machine; and
   means for causing the weaving machine to weave the textile product according to the order record so as to have a representation of the image on a face of the textile product.

21. The system of claim 20, wherein the textile product is a loop-pile textile.

22. The system of claim 20, wherein the textile product is a towel or a rug.

23. The system of claim 20, wherein the textile product is a non-loop-pile textile.

24. The system of claim 20, wherein the automated weaving machine includes a jacquard machine.

25. The system of claim 24, wherein the jacquard machine includes a computer processor and memory and is adapted to store a plurality of said order records for producing a batch of said textile products.

26. A method of producing a textile product, including the steps of:
   receiving order information from a customer over a network, the order information including an image to be reproduced on the textile product;
   processing the order information to create an order record readable by an automated weaving system;
   transmitting the order record to the weaving system to enable the weaving system to weave the textile product according to the order record so as to have a representation of the image on a face of the textile product.

27. A system for producing a textile product, including:
   means for receiving order information from a customer over a network, the order information including an image to be reproduced on the textile product;
   means for processing the order information to create an order record readable by an automated weaving system;
   means for transmitting the order record to the automated weaving system to enable the automated weaving system to weave the textile product according to the order record so as to have a representation of the image on a face of the textile product.

28. The system of claim 27, wherein the weaving system includes a server for receiving the order record and at least one automated weaving machine responsive to the server for weaving the textile product.

29. The system of claim 20 or 27, wherein the order information further includes the following:
   (a) payment information to enable the customer to be charged a payment for the production of the textile or account information relating to a pre-existing account of the customer;
   (b) information concerning text which is to be woven with the representation of the image on the textile;
   (c) information as to which of a predetermined set of binary colors is to be used for representing the image on the textile product;
   (d) information as to a preferred size of the textile product, selected from a predetermined set of size options;
   (e) information as to a preferred textile material to be used for the textile product, selected from a predetermined list of materials; and
   (f) address and contact information of the customer.

30. The system of claim 27, wherein the automated weaving system is distributed over one or more production facilities, each facility having at least one automated weaving machine for weaving the textile product.

31. A textile production system for producing a textile product, including:
   an automated weaving system, wherein the automated weaving system is distributed over one or more production facilities, each facility having at least one automated weaving machine for weaving the textile product;
   means for receiving order information from a customer over a network, the order information including an image to be reproduced on the textile product;
   means for processing the order information to create an order record readable by the automated weaving system;
   means for transmitting the order record to the automated weaving system to enable the automated weaving system to weave the textile product according to the order record so as to have a representation of the image on a face of the textile product.

32. The system of claim 20, 27 or 31, wherein the image includes one or more graphics and/or text images.

* * * * *